(12) United States Patent
Eromaki et al.

(10) Patent No.: US 9,086,207 B2
(45) Date of Patent: Jul. 21, 2015

(54) APPARATUS, METHODS, AND NON-TRANSITORY COMPUTER READABLE STORAGE MEDIUMS FOR CONTROLLING LIGHT EMITTED BY A FLASH UNIT

(75) Inventors: Marko Eromaki, Tampere (FI); Mikko Antti Ollila, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/364,100

(22) PCT Filed: Dec. 19, 2011

(86) PCT No.: PCT/IB2011/055770
§ 371 (c)(1),
(2), (4) Date: Jun. 10, 2014

(87) PCT Pub. No.: WO2013/093549
PCT Pub. Date: Jun. 27, 2013

(65) Prior Publication Data
US 2014/0313690 A1    Oct. 23, 2014

(51) Int. Cl.
*F21L 19/00* (2006.01)
*F23D 11/24* (2006.01)
*F21V 5/04* (2006.01)
*G03B 15/05* (2006.01)
*G03B 15/02* (2006.01)

(52) U.S. Cl.
CPC ............... *F21V 5/045* (2013.01); *G03B 15/02* (2013.01); *G03B 15/05* (2013.01); *G03B 2215/0592* (2013.01)

(58) Field of Classification Search
CPC ........ F21V 5/045; G03B 15/02; G03B 15/05; G03B 2215/0592
See application file for complete search history.

(56) References Cited

U.S. PATENT DOCUMENTS

| 5,717,964 A | 2/1998 | Dowe ........................... 396/165 |
| 5,813,743 A | 9/1998 | Naka ............................ 362/16 |
| 8,021,006 B2 | 9/2011 | Shyu et al. ..................... 362/3 |
| 2001/0028559 A1 | 10/2001 | Tenmyo ......................... 362/16 |

FOREIGN PATENT DOCUMENTS

| CN | 102170730 A | 8/2011 |
| EP | 1558025 A2 | 7/2005 |
| JP | 2291538 | 12/1990 |
| JP | 6230455 | 8/1994 |
| JP | 9160102 | 6/1997 |
| JP | 2003287789 A | 10/2003 |
| JP | 2005173124 A | 6/2005 |

OTHER PUBLICATIONS

"Flash Photography with Canon EO Cameras—Part III"; Version 1.8; Dec. 12, 2010; <http://photonotes.org/articles/eos-flash/>; 38 pgs.

*Primary Examiner* — Joseph L Williams
(74) *Attorney, Agent, or Firm* — Harrington & Smith (57) ABSTRACT

An apparatus comprising: a first optical member configured to receive light from a flash unit, in a first direction, to refract the received light, and to output the refracted light in a second direction, different to the first direction; and a first actuator configured to move the first optical member between a first position in which light from the flash unit is not substantially refracted, and a second position in which light from the flash unit is refracted by the first optical member in the second direction.

20 Claims, 5 Drawing Sheets

APPARATUS, METHODS, AND NON-TRANSITORY COMPUTER READABLE STORAGE MEDIUMS FOR CONTROLLING LIGHT EMITTED BY A FLASH UNIT

TECHNOLOGICAL FIELD

Embodiments of the present invention relate to apparatus, methods and non-transitory computer readable storage mediums for controlling light emitted by a flash unit. In particular, they relate to apparatus, methods and non-transitory computer readable storage mediums in a portable electronic device.

BACKGROUND

Apparatus, such as mobile cellular telephones, usually include a camera and a flash unit that enables the apparatus to capture still images and/or video. The flash unit is typically used in low light levels and is usually arranged to provide a cone of light that illuminates the field of view of the camera.

Under some circumstances, the light emitted by the flash unit may result in poor images being obtained by the camera. For example, where an article in the camera's field of view is highly reflective, use of the flash unit may result in a captured image having an overexposed area that corresponds to the article.

It would therefore be desirable to provide an alternative apparatus.

BRIEF SUMMARY

According to various, but not necessarily all, embodiments of the invention there is provided an apparatus comprising: a first optical member configured to receive light from a flash unit, in a first direction, to refract the received light, and to output the refracted light in a second direction, different to the first direction; and a first actuator configured to move the first optical member between a first position in which light from the flash unit is not substantially refracted, and a second position in which light from the flash unit is refracted by the first optical member in the second direction.

The first optical member may include a magnet, and the first actuator includes a first electromagnet configured to attract the magnet of the first optical member and to move the first optical member to the first position, and a second electromagnet configured to attract the magnet of the first optical member and to move the first optical member to the second position.

The apparatus may further comprise a controller configured to receive an input signal from a user input device and may be configured to control the first actuator to move the first optical member between the first position and the second position in response to the user input signal.

The apparatus may further comprise a controller configured to determine if light from the flash unit should be redirected, and to control the first actuator to move the first optical member between the first position and the second position in response to the determination.

The first optical member may be further configured to refract the received light from the flash unit in a third direction, different to the first and second directions, the first actuator being further configured to move the first optical member to a third position in which light from the flash unit is refracted by the first optical member in the third direction.

The first actuator may be configured to move the first optical member perpendicular relative to the first direction.

The first optical member may include a Fresnel lens.

The apparatus may be configured to enable a user to replace the first optical member with a different optical member.

The apparatus may further comprise: a second optical member configured to receive light from the flash unit, to refract the received light, and to output the refracted light in a fourth direction, different to the first, second and third directions; and a second actuator configured to move the second optical member between a first position in which light from the flash unit is not substantially refracted, and a second position in which light from the flash unit is refracted by the second optical member in the fourth direction.

The second actuator may be configured to move the second optical member perpendicular relative to the first direction, and the first optical member and the second optical member may have an overlaying arrangement when the first optical member is in the second position and the second optical member is in the second position, the overlaying relationship being configured to refract light from the flash unit in a direction corresponding to a combination of the second direction and the fourth direction.

The apparatus may further comprise: a third optical member configured to receive light from the flash unit and to magnify the received light; and a third actuator configured to move the third optical member between a first position in which light from the flash unit is not substantially magnified, and a second position in which light from the flash unit is magnified by the third optical member.

According to various, but not necessarily all, embodiments of the invention there is provided a portable electronic device comprising an apparatus as described in any of the preceding paragraphs.

According to various, but not necessarily all, embodiments of the invention there is provided a method comprising: controlling a first actuator to move a first optical member, the first optical member being configured to receive light from a flash unit, in a first direction, to refract the received light, and to output the refracted light in a second direction, different to the first direction, between a first position in which light from the flash unit is not substantially refracted, and a second position in which light from the flash unit is refracted by the first optical member in the second direction.

The first optical member may include a magnet, and the first actuator may include a first electromagnet configured to attract the magnet of the first optical member and to move the first optical member to the first position, and a second electromagnet configured to attract the magnet of the first optical member and to move the first optical member to the second position.

The method may further comprise receiving an input signal from a user input device and controlling the first actuator to move the first optical member between the first position and the second position in response to the user input signal.

The method may further comprise determining if light from the flash unit should be redirected, and controlling the first actuator to move the first optical member between the first position and the second position in response to the determination.

The first optical member may be further configured to refract the received light from the flash unit in a third direction, different to the first and second directions, and the method may further comprise controlling the first actuator to move the first optical member to a third position in which light from the flash unit is refracted by the first optical member in the third direction.

The first actuator may be configured to move the first optical member perpendicular relative to the first direction.

The first optical member may include a Fresnel lens.

The method may further comprise: controlling a second actuator to move a second optical member, the second optical member being configured to receive light from the flash unit, to refract the received light, and to output the refracted light in a fourth direction, different to the first, second and third directions, between a first position in which light from the flash unit is not substantially refracted, and a second position in which light from the flash unit is refracted by the second optical member in the fourth direction.

The second actuator may be configured to move the second optical member perpendicular relative to the first direction, and the first optical member and the second optical member may have an overlaying arrangement when the first optical member is in the second position and the second optical member is in the second position, the overlaying relationship may be configured to refract light from the flash unit in a direction corresponding to a combination of the second direction and the fourth direction.

The method may further comprise: controlling a third actuator to move a third optical member, the third optical member being configured to receive light from a flash unit and to magnify the received light, between a first position in which light from the flash unit is not substantially magnified, and a second position in which light from the flash unit is magnified by the third optical member.

According to various, but not necessarily all, embodiments of the invention there is provided a non-transitory computer-readable storage medium encoded with instructions that, when performed by a processor, cause performance of: controlling a first actuator to move a first optical member, the first optical member being configured to receive light from a flash unit, in a first direction, to refract the received light, and to output the refracted light in a second direction, different to the first direction, between a first position in which light from the flash unit is not substantially refracted, and a second position in which light from the flash unit is refracted by the first optical member in the second direction.

The first optical member may include a magnet, and the first actuator may include a first electromagnet configured to attract the magnet of the first optical member and to move the first optical member to the first position, and a second electromagnet configured to attract the magnet of the first optical member and to move the first optical member to the second position.

The non-transitory computer-readable storage medium may be encoded with instructions that, when performed by a processor, cause performance of: receiving an input signal from a user input device and controlling the first actuator to move the first optical member between the first position and the second position in response to the user input signal.

The non-transitory computer-readable storage medium may be encoded with instructions that, when performed by a processor, cause performance of determining if light from the flash unit should be redirected, and controlling the first actuator to move the first optical member between the first position and the second position in response to the determination.

The first optical member may be further configured to refract the received light from the flash unit in a third direction, different to the first and second directions, and the non-transitory computer readable storage medium may be encoded with instructions that, when performed by a processor, cause performance of controlling the first actuator to move the first optical member to a third position in which light from the flash unit is refracted by the first optical member in the third direction.

The first actuator may be configured to move the first optical member perpendicular relative to the first direction.

The first optical member may include a Fresnel lens.

The non-transitory computer-readable storage medium may be encoded with instructions that, when performed by a processor, cause performance of: controlling a second actuator to move a second optical member, the second optical member being configured to receive light from the flash unit, to refract the received light, and to output the refracted light in a fourth direction, different to the first, second and third directions, between a first position in which light from the flash unit is not substantially refracted, and a second position in which light from the flash unit is refracted by the second optical member in the fourth direction.

The second actuator may be configured to move the second optical member perpendicular relative to the first direction, and the first optical member and the second optical member may have an overlaying arrangement when the first optical member is in the second position and the second optical member is in the second position, the overlaying relationship may be configured to refract light from the flash unit in a direction corresponding to a combination of the second direction and the fourth direction.

The non-transitory computer-readable storage medium may be encoded with instructions that, when performed by a processor, cause performance of: controlling a third actuator to move a third optical member, the third optical member being configured to receive light from a flash unit and to magnify the received light, between a first position in which light from the flash unit is not substantially magnified, and a second position in which light from the flash unit is magnified by the third optical member.

According to various, but not necessarily all, embodiments of the invention there is provided a computer program that, when run on a computer, performs: the method of any of the preceding paragraphs.

BRIEF DESCRIPTION

For a better understanding of various examples of embodiments of the present invention reference will now be made by way of example only to the accompanying drawings in which.

DETAILED DESCRIPTION

In the following description, the wording 'connect' and 'couple' and their derivatives mean operationally connected or coupled. It should be appreciated that any number or combination of intervening components can exist (including no intervening components).

Figure 2:
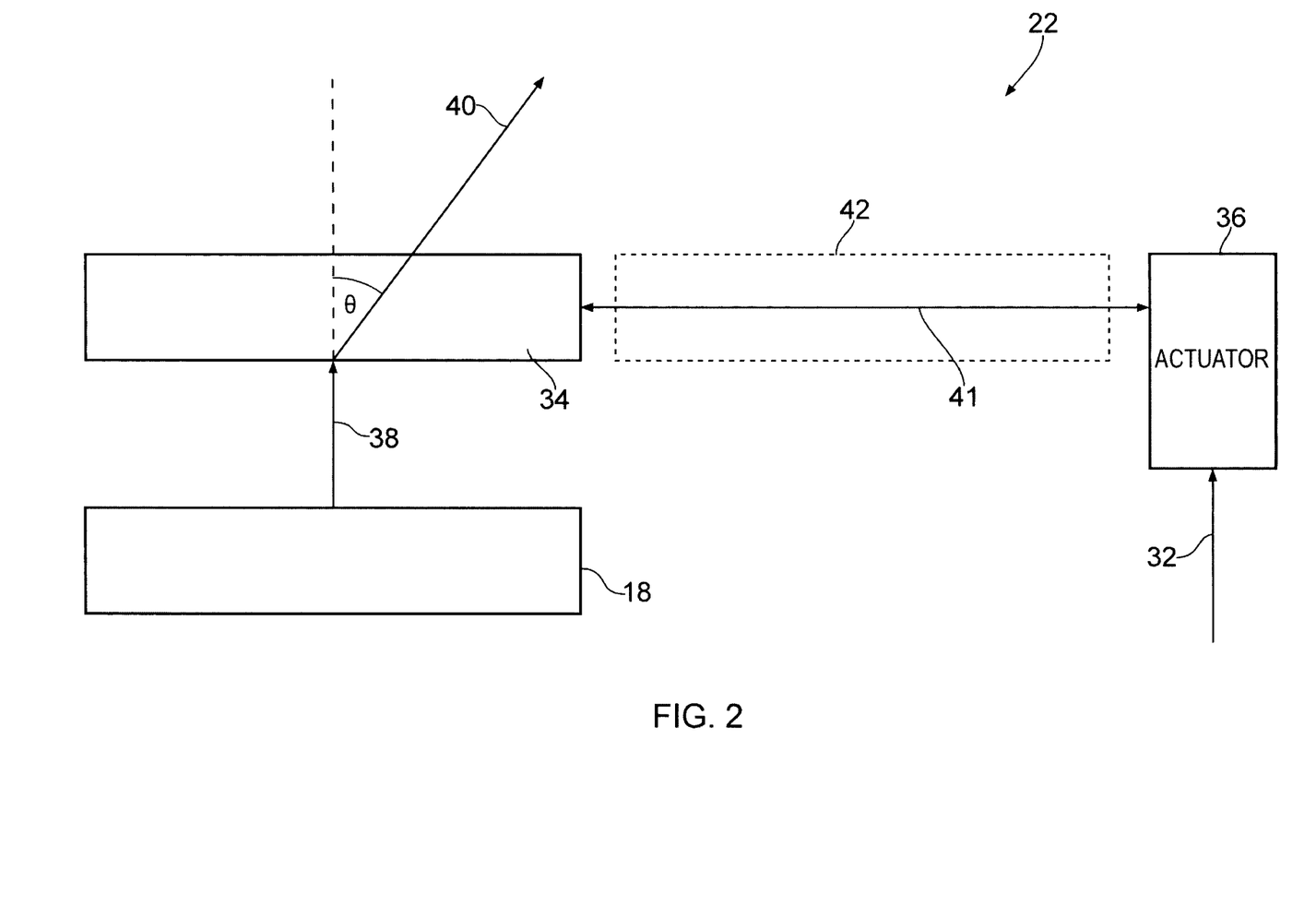
FIG. 2 illustrates a schematic side view diagram of an apparatus according to various embodiments of the invention.
Figure 4:
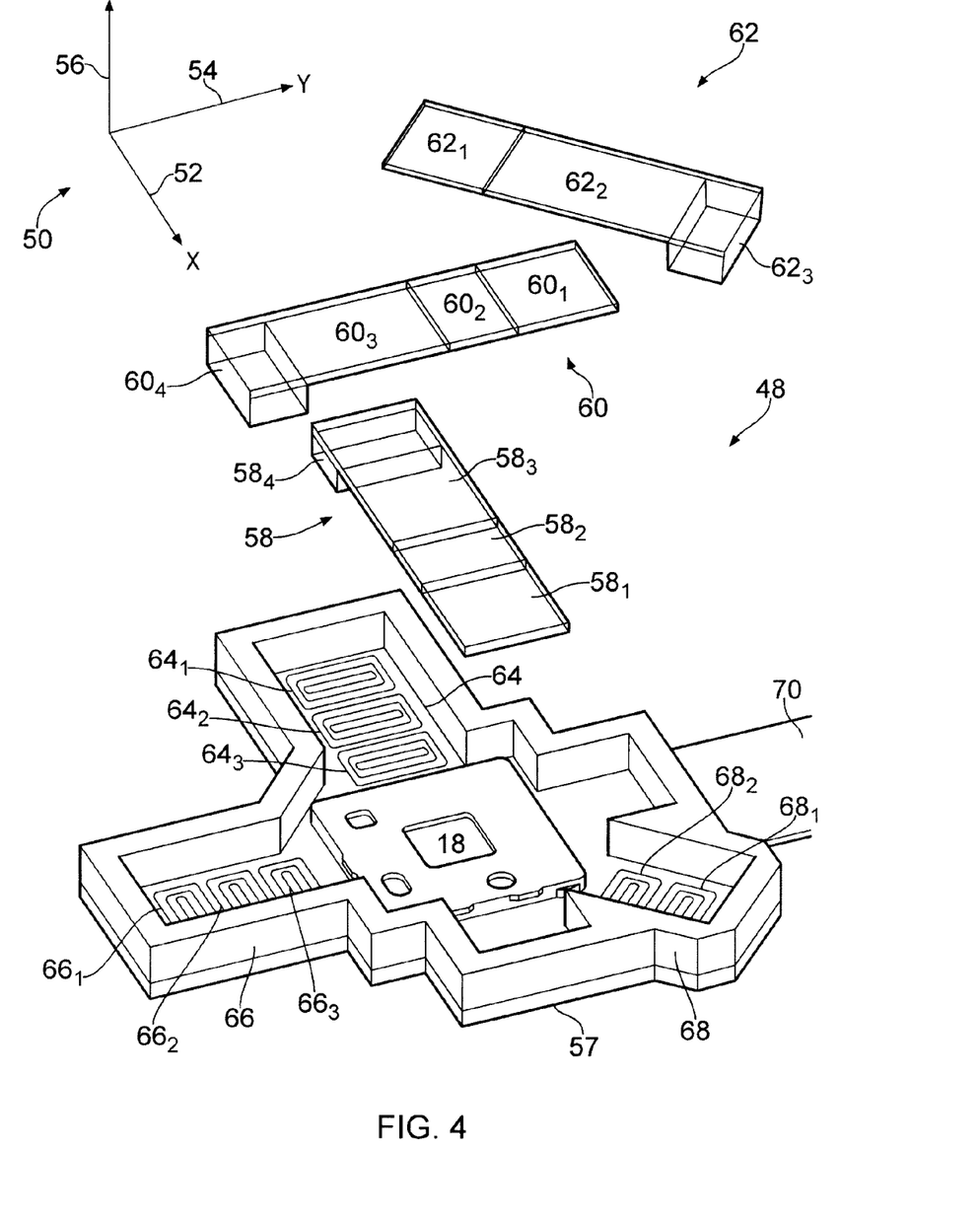
FIG. 4 illustrates a perspective view diagram of another apparatus according to various embodiments of the invention.

FIGS. 2 and 4 illustrate an apparatus 22, 48 comprising: a first optical member 34, 58, 60 configured to receive light 38 from a flash unit 18, in a first direction, to refract the received light, and to output the refracted light 40 in a second direction, different to the first direction; and a first actuator 36, 64, 66 configured to move the first optical member 34, 58, 60 between a first position in which light from the flash unit 18 is not substantially refracted, and a second position in which light from the flash unit 18 is refracted by the first optical member 34, 58, 60 in the second direction.

Figure 1:
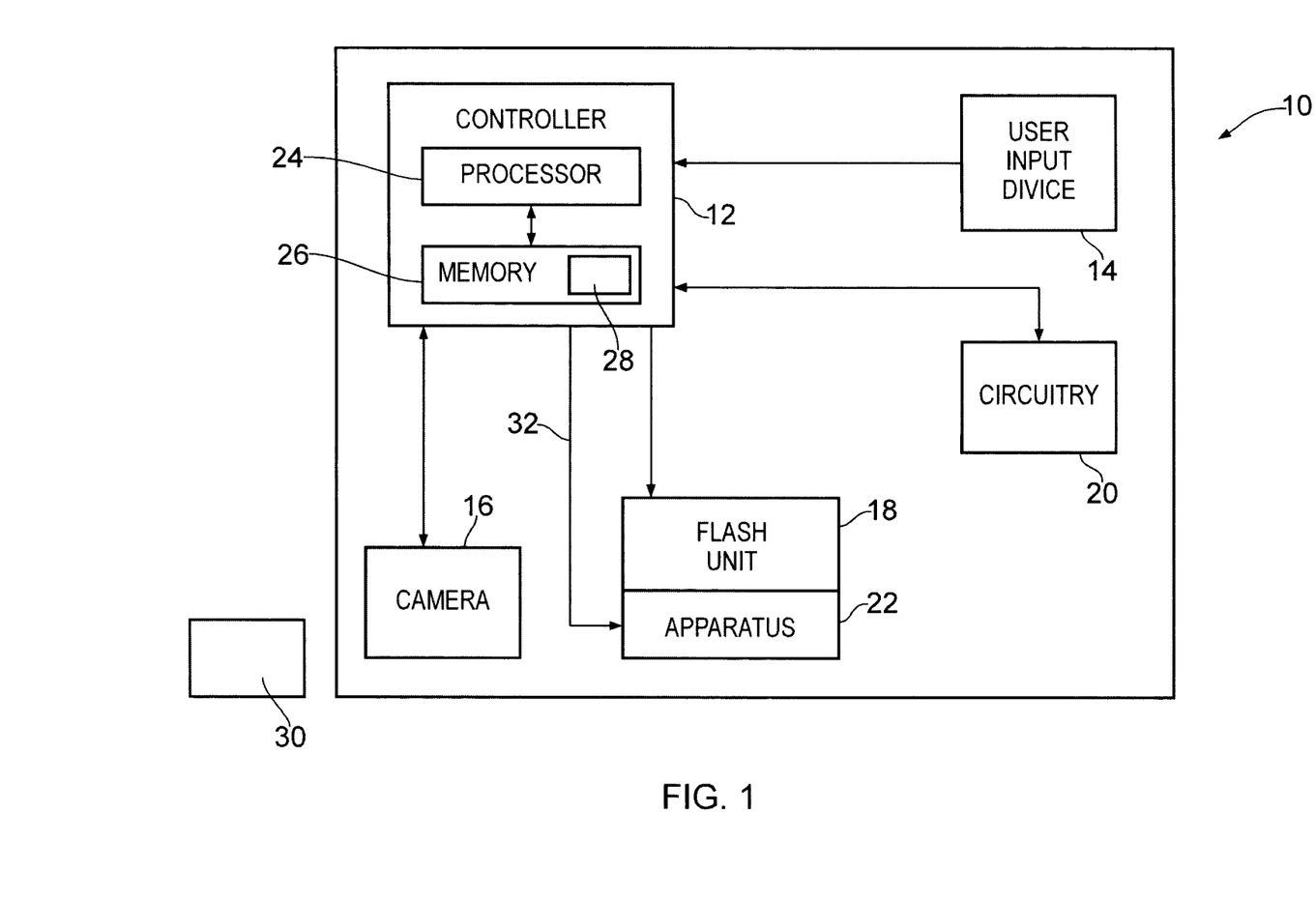
FIG. 1 illustrates a schematic diagram of an electronic device according to various embodiments of the invention.

FIG. 1 illustrates a schematic diagram of an electronic device 10 according to various embodiments of the invention. The electronic device 10 includes a controller 12, a user input device 14, a camera 16, a flash unit 18, circuitry 20 and an apparatus 22.

The electronic device 10 may be any apparatus and may be a hand portable electronic communication device (for example, a mobile cellular telephone, a tablet computer, a laptop computer, a personal digital assistant or a hand held computer), a non-portable electronic device (for example, a personal computer), a portable multimedia device (for example, a music player, a video player, a game console and so on) or a module for such devices. As used here, 'module' refers to a unit or apparatus that excludes certain parts or components that would be added by an end manufacturer or a user.

The implementation of the controller 12 can be in hardware alone (for example, a circuit, a processor and so on), have certain aspects in software including firmware alone or can be a combination of hardware and software (including firmware).

The controller 12 may be implemented using instructions that enable hardware functionality, for example, by using executable computer program instructions in a general-purpose or special-purpose processor that may be stored on a computer readable storage medium (disk, memory and so on) to be executed by such a processor.

In this embodiment, the controller 12 includes a processor 24 and a memory 26. The processor 24 is configured to read from and write to the memory 26. The processor 24 may also comprise an output interface via which data and/or commands are output by the processor 24 and an input interface via which data and/or commands are input to the processor 24.

The memory 26 stores a computer program 28 comprising computer program instructions that control the operation of the electronic device 10 when loaded into the processor 24. The computer program instructions 28 provide the logic and routines that enables the electronic device 10 to perform the methods illustrated in FIGS. 5 and 6. The processor 24 by reading the memory 26 is able to load and execute the computer program 28.

The computer program 28 may arrive at the electronic device 10 via any suitable delivery mechanism 30. The delivery mechanism 30 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 28. The delivery mechanism 30 may be a signal configured to reliably transfer the computer program 28. The electronic device 10 may propagate or transmit the computer program 28 as a computer data signal.

Although the memory 26 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' and so on or a 'controller', 'computer', 'processor' and so on should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code and so on should be understood to encompass software for a programmable processor or firmware such as, for example, the programmable content of a hardware device whether instructions for a processor, or configuration settings for a fixed-function device, gate array or programmable logic device and so on.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The user input device 14 may be any suitable user input device and may be, for example, a touch screen display, a keypad, a keyboard or a joystick. The user input device 14 is configured to be manipulated by a user and to provide an input signal to the controller 12 in response. A user may use the user input device 14 to operate the electronic device 10.

The camera 16 may be any image sensor and may be a charge coupled device (CCD) camera or a complementary metal oxide semiconductor (CMOS) camera. The controller 12 is configured to control the camera 16 to capture an image and the camera 16 is configured to provide the captured image to the controller 12. The controller 12 may then store the captured image in the memory 26 or control a display to display the captured image. It should be appreciated that the camera 16 may be configured to capture still images and/or video.

The flash unit 18 may be any light source that is configured to illuminate an area. For example, the flash unit 18 may be configured to illuminate an area to enable the camera 16 to capture an image of the area. By way of another example, the flash unit 18 may be configured to illuminate an area to enable a user of the electronic device 10 to view the area (that is, the flash unit 18 may function as a torch). The flash unit 18 may be a light emitting diode (LED) flash unit or a xenon flash unit for example. The controller 12 is configured to control the flash unit 18 to provide illumination and this control may be synchronised with the control of the camera 16 or may be in response to an input signal from the user input device 14 (for example, to activate a torch mode).

The circuitry 20 may include any other circuitry of the electronic device 10. For example, in various embodiments the circuitry 20 may include a display, a loudspeaker, a microphone, a transceiver and one or more antennas. The controller 12 is configured to provide control signals to the circuitry 20 (for example, to control a display or a loudspeaker) and to receive signals from the circuitry 20 (for example, signals received by the one or more antennas).

The apparatus 22 is configured to receive the light emitted by the flash unit 18 and to re-direct the light in a different direction and (optionally) to magnify the light. The controller 12 is configured to provide a control signal 32 to the apparatus 22 to control the redirection of the light emitted by the flash unit 18. The apparatus 22 will be described in greater detail in the following paragraphs.

FIG. 2 illustrates a schematic side view diagram of an apparatus 22 according to various embodiments of the invention and the flash unit 18. The apparatus 22 includes an optical member 34 and an actuator 36.

The optical member 34 may be any suitable optical member that is configured to refract light and may include a prism or a Fresnel lens for example. The optical member 34 is configured to receive light 38 from the flash unit 18, to refract the received light, and to output the refracted light 40.

In more detail, the optical member 34 is configured to receive the light 38 from the flash unit 18 in a first direction (the light 38 is oriented substantially perpendicular to the top surface of the flash unit 18). The optical member 34 is configured to refract the received light 38 and to output the refracted light 40 in a second direction that is different to the first direction. As illustrated in FIG. 2, the refracted light 40 is refracted to the right by an angle of theta (θ) relative to the light 38 (and consequently, there is a difference of theta (θ) between the first direction and the second direction).

It should be appreciated that the light emitted from the flash unit 18 may form a cone of light and that the arrows 38, 40 illustrated in FIG. 2 may therefore represent the orientation of the centre of the cone of light. In other words, the arrow 38 may represent the orientation of the centre of the cone of light emitted by the flash unit 18, and the arrow 40 may represent the orientation of the centre of the cone of light refracted by the optical member 34.

The actuator 36 may be any suitable actuator and may be a piezoelectric actuator or a voice coil motor (VCM) actuator for example. The actuator 36 is configured to receive the control signal 32 from the controller 12 (illustrated in FIG. 1) and to move the optical member 34 in response.

In this embodiment, the actuator 36 is configured to move the optical member 34 perpendicular to the direction of the light 38 (and parallel to the top surface of the flash unit 18) and this is represented by the arrow 41. It should be appreciated that in other embodiments, the actuator 36 may be configured to move the optical member 34 in a direction that is different to perpendicular to the direction of the light 38.

The actuator 36 is configured to move the optical member 34 between a first position in which light from the flash unit 18 is not substantially refracted (the position represented by dotted lines 42 in FIG. 2), and a second position in which light from the flash unit 18 is refracted by the optical member 34 (that is, the position illustrated in FIG. 2). In the first position, the optical member 34 is positioned away from the flash unit 18 and does not overlay the flash unit 18. Consequently, the optical member 34 does not refract the light 38 emitted by the flash unit 18 when in the first position. In the second position, the optical member 34 is positioned so that it at least partially overlays the flash unit 18 and receives the light 38 from the flash unit 18. Therefore, the optical member 34 refracts the light 38 emitted by the flash unit 18 when in the second position.

Various embodiments of the invention provide an advantage in that they enable light from the flash unit 18 to be selectively redirected depending upon the position of the optical member 34 relative to the flash unit 18 without re-orientating the camera 16 or the electronic device 10. This may be advantageous where it is desired to illuminate a particularly dark area, or to direct the flash to a particular article (such as a person being photographed) that requires illumination.

Figure 3:
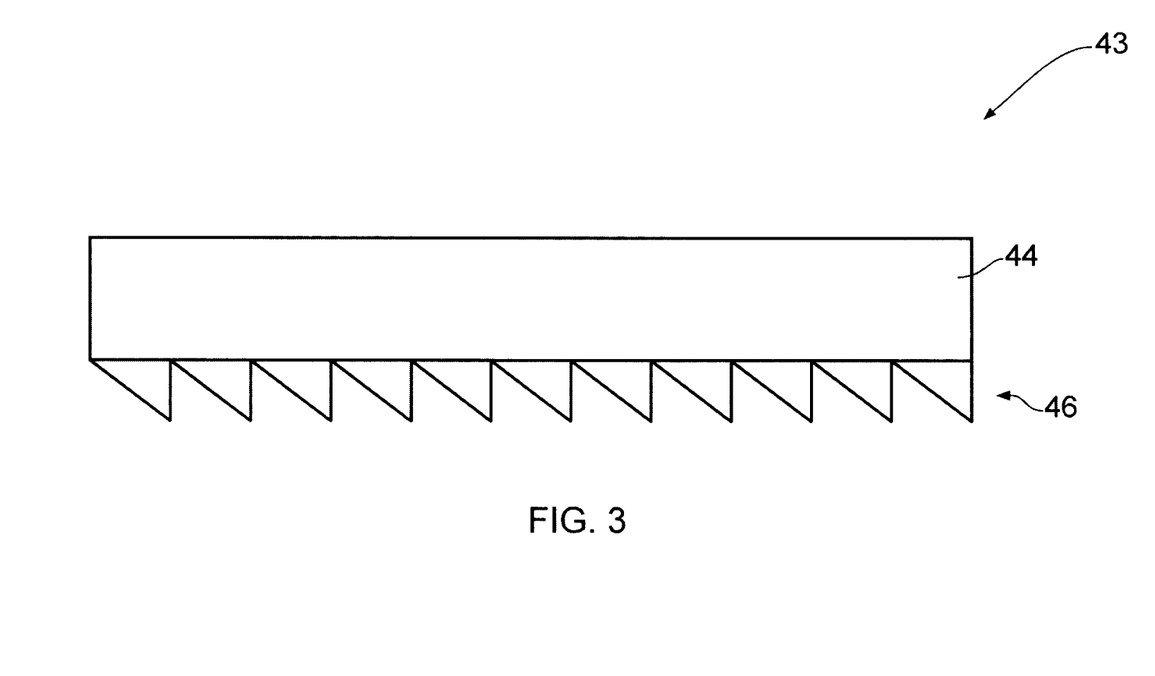
FIG. 3 illustrates a side view diagram of an optical member according to various embodiments of the invention.

FIG. 3 illustrates a side view diagram of an optical member 43 according to various embodiments of the invention. The optical member 43 illustrated in FIG. 3 may be used as the optical member illustrated in FIG. 2 and/or as one or more of the optical members illustrated in FIG. 4. The optical member 43 is a Fresnel lens and includes a substrate 44 and a plurality of prisms 46 that form a repeating prismatic structure.

The substrate 44 may comprise any suitable materials and in this embodiment, comprises polyester and has a thickness of one hundred micrometers. The plurality of prisms 46 may comprise any suitable materials and in this embodiment, comprises a modified acrylic resin and has a thickness of fifty micrometers. The optical member 43 has a deviation angle of twenty degrees (that is, there is a twenty degree angle between light entering and light leaving the optical member 43). It should be appreciated that in other embodiments, the optical member 43 may have a different deviation angle (for example, the deviation angle may be five degrees, ten degrees or fifteen degrees).

In some embodiments, the optical member 43 may include a Fresnel pattern (that is, a plurality of concentric prismatic rings) instead of the illustrated wedge structure of the plurality of prisms 46. In these embodiments, the pitch of the prismatic shapes of the Fresnel pattern may be fifty micrometers for example.

The optical member 43 is a film that is relatively thin (having a thickness of one hundred and fifty micrometers) and lightweight. The optical member 43 provides an advantage in the apparatus 22 since the actuator 36 may require relatively little electrical power to move the optical member 43 (since it is a relatively light weight film). Furthermore, since the optical member 43 is relatively thin, the apparatus 22 advantageously does not substantially increase the thickness of the flash unit 18. Consequently, incorporation of an apparatus 22 in an electronic device 10 may not significantly increase the electrical energy consumption of the electronic device 10 and may not increase substantially increase the dimensions of the electronic device 10.

FIG. 4 illustrates an exploded perspective view diagram of another apparatus 48 according to various embodiments of the invention, a flash unit 18 and a Cartesian co-ordinate system 50.

The Cartesian co-ordinate system 50 includes an X axis 52, a Y axis 54 and a Z axis 56. The X axis 52, the Y axis 54 and the Z axis 56 are orthogonal to one another.

The apparatus 48 includes a housing 57, a first optical member 58, a second optical member 60, a third optical member 62, a first actuator 64, a second actuator 66, a third actuator 68 and a cable 70.

The housing 57 is configured to house the first optical member 58, the second optical member 60, the third optical member 62, the first actuator 64, the second actuator 66 and the third actuator 68 and to protect them from the environment and being damaged. The housing 57 is substantially planar and is positioned in a plane that is substantially parallel to the plane formed by the X axis 52 and the Y axis 54.

The components housed by the housing 57 may be relatively small and this may result in the housing 57 being relatively small and being similar in size to the flash unit 18. For example in this embodiment, the length of the housing 57 is eleven millimeters (that is, the housing 57 may be eleven millimeters long in the X direction). The width of the housing 57 may be eleven millimeters (that is, the housing 57 may be eleven millimeters wide in the Y direction). The housing 57 may be relatively thin and have a thickness of 0.5 to 0.6 millimeters (that is, the depth of housing may be 0.5 to 0.6 millimeters in the Z direction).

The flash unit 18 is positioned approximately in the centre of the housing 57. The flash unit 18 is substantially planar and is positioned in a plane that is substantially parallel to the plane formed by the X axis 52 and the Y axis 54. The flash unit 18 is configured to output light in the +Z direction (that is, the light is output in a direction that is perpendicular to the top surface of the flash unit 18).

The first optical member 58 includes a first portion $58_1$, a second portion $58_2$, a third portion $58_3$ and a magnet $58_4$. The first portion $58_1$, the second portion $58_2$, the third portion $58_3$ and the magnet $58_4$ are coupled together to provide a single moveable film. The first portion $58_1$ has a refractive index that causes light emitted by the flash unit 18 to be redirected in the +X and +Z directions (that is, the refractive index of the first portion $58_1$ is different to one). The second portion $58_2$ has a refractive index of one and consequently does not refract light emitted by the flash unit 18. The third portion $58_3$ has a refractive index that causes light emitted by the flash unit 18 to be redirected in the –X and +Z directions (that is, the refractive index of the first portion $58_1$ is different to one).

The second optical member 60 includes a first portion $60_1$, a second portion $60_2$, a third portion $60_3$ and a magnet $60_4$. The first portion $60_1$, the second portion $60_2$, the third portion $60_3$ and the magnet $60_4$ are coupled together to provide a single moveable film. The first portion $60_1$ has a refractive index that causes light emitted by the flash unit 18 to be redirected in the +Y and +Z directions (that is, the refractive index of the first portion $60_1$ is different to one). The second portion $60_2$ has a refractive index of one and consequently does not refract light emitted by the flash unit 18. The third portion $60_3$ has a refractive index that causes light emitted by the flash unit 18 to be redirected in the –Y and +Z directions (that is, the refractive index of the first portion $60_1$ is different to one).

The third optical member 62 includes a first portion $62_1$, a second portion $62_2$ and a magnet $62_3$. The first portion $62_1$, the second portion $62_2$ and the magnet $62_4$ are coupled together to provide a single moveable film. The first portion $62_1$ has a refractive index that causes light emitted by the flash unit 18 to be magnified or de-magnified (that is, the first portion $62_1$ increases or decreases the width of the cone of light emitted by the flash unit 18 in the X direction and/or the Y direction at a given Z position). The second portion $62_2$ has a refractive index of one and consequently does not magnify or de-magnify light emitted by the flash unit 18.

The first actuator 64 includes a first electromagnet $64_1$, a second electromagnet $64_2$ and a third electromagnet $64_3$. The first electromagnet $64_1$ is configured to attract the magnet $58_4$ of the first optical member 58 to position the first portion $58_1$ in an overlaying relationship with the flash unit 18. The second electromagnet $64_2$ is configured to attract the magnet $58_4$ of the first optical member 58 to position the second portion $58_2$ in an overlaying relationship with the flash unit 18. The third electromagnet $64_3$ is configured to attract the magnet $58_4$ of the first optical member 58 to position the third portion $58_3$ in an overlaying relationship with the flash unit 18. Consequently, the first actuator 64 is configured to control the position of the first optical member 58 and thus control the re-direction of the light emitted by the flash unit 18 in the +X direction.

The second actuator 66 includes a first electromagnet $66_1$, a second electromagnet $66_2$ and a third electromagnet $66_3$. The first electromagnet $66_1$ is configured to attract the magnet $60_4$ of the second optical member 60 to position the first portion $60_1$ in an overlaying relationship with the flash unit 18. The second electromagnet $66_2$ is configured to attract the magnet $60_4$ of the second optical member 60 to position the second portion $60_2$ in an overlaying relationship with the flash unit 18. The third electromagnet $66_3$ is configured to attract the magnet $60_4$ of the second optical member 60 to position the third portion $60_3$ in an overlaying relationship with the flash unit 18. Consequently, the second actuator 66 is configured to control the position of the second optical member 60 and thus control the re-direction of the light emitted by the flash unit 18 in the –Y direction.

The third actuator 68 includes a first electromagnet $68_1$ and a second electromagnet $68_2$. The first electromagnet $68_1$ is configured to attract the magnet $62_3$ of the third optical member 60 to position the first portion $62_1$ in an overlaying relationship with the flash unit 18. The second electromagnet $68_2$ is configured to attract the magnet $62_3$ of the third optical member 62 to position the second portion $62_2$ in an overlaying relationship with the flash unit 18. Consequently, the third actuator 68 is configured to control the position of the third optical member 62 and thus control the magnification or de-magnification of the light emitted by the flash unit 18.

The first optical member 58, the second optical member 60 and the third optical member 62 are positioned at different heights along the Z axis 56 (in this embodiment, the magnets $58_4$, $60_4$ and $62_3$ have different thicknesses). Consequently, the first optical member 58, the second optical member 60 and the third optical member 62 may overlay one another and thus, light emitted by the flash unit 18 may be re-directed in the X and Y directions simultaneously and may also be simultaneously magnified or de-magnified. For example, where the apparatus 48 may be configured such that the first portion $58_1$, the first portion $60_1$ and the first portion $62_1$ overlay the flash unit 18 and in this configuration, the light emitted by the flash unit 18 is re-directed in the +X and +Y directions and is also magnified.

The cable 70 is connected between the controller 12 illustrated in FIG. 1 and the components of the apparatus 48 and is configured to provide the control signal 32 to the apparatus 48 to enable the controller 12 to control the actuators 64, 66 and 68.

The apparatus 48 may be relatively inexpensive to manufacture since the electromagnets of the first actuator 64, the second actuator 66 and the third actuator 68 may be embedded in a printed wiring board of the housing 57. Consequently, the electromagnets may thus be advantageously manufactured in the layering process of the printed wiring board.

The apparatus 48 is configured to enable a user to replace the first optical member 58 and/or the second optical member 60 and/or the third optical member 62 with different optical members having different refractive indexes or having different filtering capabilities. For example, the apparatus 48 may comprise a user removable cover that, when removed, enables a user to access the optical members 58, 60, 62 and replace them with different optical members. This may advantageously enable a user to select those optical members for use with the flash unit 18 that best suit the user's application.

The apparatus 48 may also provide an advantage in that since the actuators 64, 66, 68 are relatively simple to control, the apparatus 48 may not require a dedicated controller and the controller of the electronic device 12 may be configured to control the actuators 64, 66, 68. This may reduce the cost of the apparatus 48.

Figure 5:
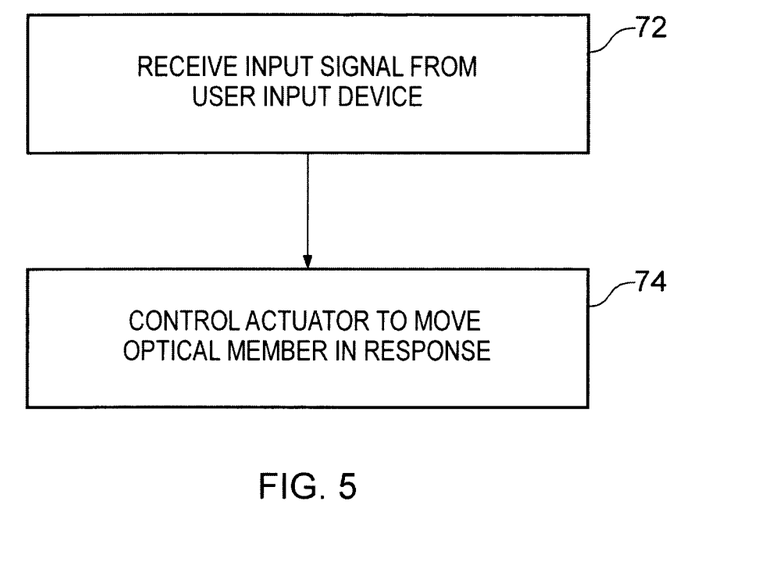
FIG. 5 illustrates a flow diagram of a method according to various embodiments of the invention.

FIG. 5 illustrates a flow diagram of a method according to various embodiments of the invention.

At block 72, the method includes receiving an input signal from the user input device 14. The input signal includes information that is indicative of the desired direction and/or magnification (or de-magnification) which the user desires the light emitted by the flash unit 18 to have. For example, a display of the electronic device 10 may display the image currently being captured by the camera 16. A user of the electronic device 10 may operate the user input device 14 to control a cursor to select an area in the captured image to which the light emitted by the flash unit 18 should be directed. A user may also operate the user input device 14 to select a magnification setting for the light emitted by the flash unit 18.

At block 74, the method includes controlling one or more actuators 36, 64, 66, 68 to move the one or more optical members 34, 58, 60, 62 using the information in the received input signal.

The method illustrated in FIG. 5 provides an advantage in that it enables a user to control the direction and/or magnification (or de-magnification) of the light emitted by the flash unit 18. This may be particularly advantageous where the user wishes to illuminate a particular area or subject (such as a profile photograph of a person).

Figure 6:
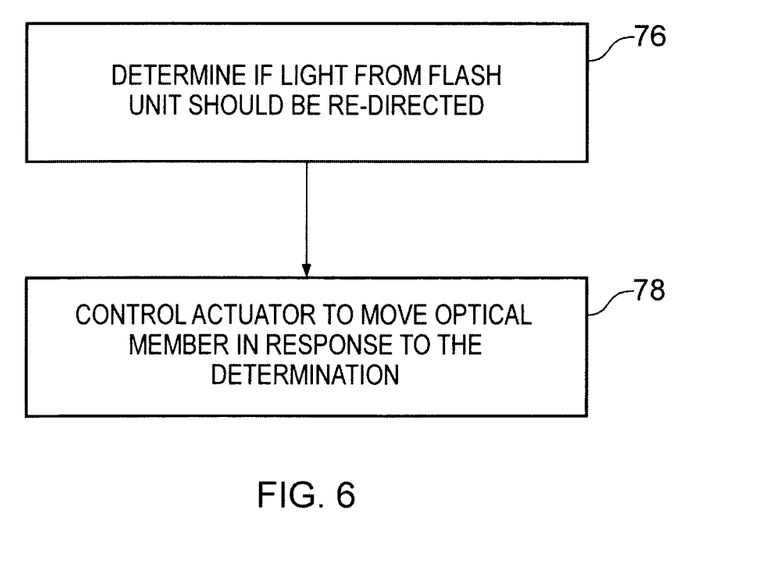
FIG. 6 illustrates a flow diagram of another method according to various embodiments of the invention.

FIG. 6 illustrates a flow diagram of another method according to various embodiments of the invention.

At block 76, the method includes determining if light emitted by the flash unit 18 should be re-directed and/or magnified (or de-magnified). For example, the controller 12 may analyse an image captured by the camera 16 to determine if there is a group of pixels having brightness below a predetermined threshold (thereby indicating a dark area of the image). If there is such a group of pixels, the controller 12 determines that the light emitted by the flash unit 18 should be re-directed to the corresponding area.

At block 78, the method includes controlling one or more actuators 36, 64, 66, 68 to move the one or more optical members 34, 58, 60, 62 using the information determined in block 76.

The method illustrated in FIG. 6 provides an advantage in that it enables the controller 12 to automatically adjust the direction and/or magnification of the light emitted by the flash unit 18 in order to improve the quality of the images captured by the camera 16. This may be particularly advantageous for users who are relatively inexperienced with electronic devices 10 incorporating cameras since the adjustment to the emitted light is performed automatically by the device 10.

The blocks illustrated in the FIGS. 5 and 6 may represent steps in a method and/or sections of code in the computer program 28. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, it should be appreciated that the apparatus 22, 48 may include any number of actuators and optical members. For example, an apparatus 22, 48 may include additional actuators and optical members for filtering the light emitted by the flash unit (for example, where the flash unit 18 is a light emitting diode, an additional black film may be used to hide the yellow light emitting diode die). Furthermore, the optical members 34, 58, 60, 62 may include any number of portions having different refractive indexes.

Additionally, it should be appreciated that embodiments of the invention may be used for controlling any electromagnetic waves emitted by a flash unit. For example, various embodiments of the invention may be configured to control the direction and/or the magnification (or de-magnification) of infra-red radiation or ultra-violet radiation.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
    a first optical member configured to receive light from a flash unit, in a first direction, to refract the received light, and to output the refracted light in a second direction, different to the first direction; and
    a first actuator configured to move the first optical member between a first position in which light from the flash unit in the first direction is not substantially refracted, and a second position in which light from the flash unit in the first direction is refracted by the first optical member in the second direction.

2. An apparatus as claimed in claim 1, wherein the first optical member includes a magnet, and the first actuator includes a first electromagnet configured to attract the magnet of the first optical member and to move the first optical member to the first position, and a second electromagnet configured to attract the magnet of the first optical member and to move the first optical member to the second position.

3. An apparatus as claimed in claim 1 or 2, further comprising a controller configured to receive an input signal from a user input device and configured to control the first actuator to move the first optical member between the first position and the second position in response to the user input signal.

4. An apparatus as claimed in claim 1 or 2, further comprising a controller configured to determine if light from the flash unit should be redirected, and to control the first actuator to move the first optical member between the first position and the second position in response to the determination.

5. An apparatus as claimed in claim 1, wherein the first optical member is further configured to refract the received light from the flash unit in a third direction, different to the first and second directions, the first actuator being further configured to move the first optical member to a third position in which light from the flash unit is refracted by the first optical member in the third direction.

6. An apparatus as claimed in claim 1, wherein the first actuator is configured to move the first optical member perpendicular relative to the first direction.

7. An apparatus as claimed in claim 1, wherein the first optical member includes a Fresnel lens.

8. An apparatus as claimed in claim 1, wherein the apparatus is configured to enable a user to replace the first optical member with a different optical member.

9. An apparatus as claimed in claim 1, further comprising:
a second optical member configured to receive light from the flash unit, to refract the received light, and to output the refracted light in a fourth direction, different to the first, second and third directions; and
a second actuator configured to move the second optical member between a first position in which light from the flash unit is not substantially refracted, and a second position in which light from the flash unit is refracted by the second optical member in the fourth direction.

10. An apparatus as claimed in claim 9, wherein the second actuator is configured to move the second optical member perpendicular relative to the first direction, and the first optical member and the second optical member having an overlaying arrangement when the first optical member is in the second position and the second optical member is in the second position, the overlaying relationship being configured to refract light from the flash unit in a direction corresponding to a combination of the second direction and the fourth direction.

11. An apparatus as claimed in claim 1, further comprising:
a third optical member configured to receive light from the flash unit and to magnify the received light; and
a third actuator configured to move the third optical member between a first position in which light from the flash unit is not substantially magnified, and a second position in which light from the flash unit is magnified by the third optical member.

12. A portable electronic device comprising an apparatus as claimed in claim 1.

13. A method comprising:
controlling a first actuator to move a first optical member, the first optical member being configured to receive light from a flash unit, in a first direction, to refract the received light, and to output the refracted light in a second direction, different to the first direction, between a first position in which light from the flash unit in the first direction is not substantially refracted, and a second position in which light from the flash unit in the first direction is refracted by the first optical member in the second direction.

14. A method as claimed in claim 13, wherein the first optical member includes a magnet, and the first actuator includes a first electromagnet configured to attract the magnet of the first optical member and to move the first optical member to the first position, and a second electromagnet configured to attract the magnet of the first optical member and to move the first optical member to the second position.

15. A method as claimed in claim 13, further comprising receiving an input signal from a user input device and controlling the first actuator to move the first optical member between the first position and the second position in response to the user input signal.

16. A method as claimed in claim 13, further comprising determining if light from the flash unit should be redirected, and controlling the first actuator to move the first optical member between the first position and the second position in response to the determination.

17. A method as claimed in claim 13, wherein the first optical member is further configured to refract the received light from the flash unit in a third direction, different to the first and second directions, and the method further comprises controlling the first actuator to move the first optical member to a third position in which light from the flash unit is refracted by the first optical member in the third direction.

18. An apparatus as claimed in claim 1 wherein the first optical member comprises a plurality of portion.

19. A non-transitory computer-readable storage medium encoded with instructions that, when performed by a processor, cause performance of:
controlling a first actuator to move a first optical member, the first optical member being configured to receive light from a flash unit, in a first direction, to refract the received light, and to output the refracted light in a second direction, different to the first direction, between a first position in which light from the flash unit in the first direction is not substantially refracted, and a second position in which light from the flash unit in the first direction is refracted by the first optical member in the second direction.

20. A non-transitory computer-readable storage medium as claimed in claim 19, wherein the first optical member includes a magnet, and the first actuator includes a first electromagnet configured to attract the magnet of the first optical member and to move the first optical member to the first position, and a second electromagnet configured to attract the magnet of the first optical member and to move the first optical member to the second position.

* * * * *

UNITED STATES PATENT AND TRADEMARK OFFICE
CERTIFICATE OF CORRECTION

PATENT NO. : 9,086,207 B2  
APPLICATION NO. : 14/364100  
DATED : July 21, 2015  
INVENTOR(S) : Marko Eromaki and Mikko Antti Ollila Page 1 of 1

It is certified that error appears in the above-identified patent and that said Letters Patent is hereby corrected as shown below:

In the claims

In Claim 3:
Column 12, line 21, "or 2" should be deleted.

In Claim 4:
Column 12, line 56, "or 2" should be deleted.

Signed and Sealed this
Eighth Day of December, 2015

Michelle K. Lee
*Director of the United States Patent and Trademark Office*